(12) United States Patent
Shany et al.

(10) Patent No.: US 6,307,810 B1
(45) Date of Patent: Oct. 23, 2001

(54) UNDERWATER LAUNCHED ACOUSTIC WARNING ASSEMBLY

(75) Inventors: Ofir Shany; Itzhak Nativ, both of Kiryat Tivon; Jacob Grinstein, Kiryat Bialik; Shabtai Botzer, Kiryat Mozkin; Shlomo Pauker, Haifa, all of (IL)

(73) Assignee: Rafael-Armament Development Authority LTD, Haifa (IL)

( * ) Notice: Subject to any disclaimer, the term of this patent is extended or adjusted under 35 U.S.C. 154(b) by 0 days.

(21) Appl. No.: 09/384,992

(22) Filed: Aug. 30, 1999

(30) Foreign Application Priority Data

Aug. 31, 1998 (IL) .......................................... 126001

(51) Int. Cl.⁷ .................................................. H04B 11/00
(52) U.S. Cl. .............................. 367/131; 367/3; 340/850; 73/170.33
(58) Field of Search ..................... 367/1, 131, 3, 367/134; 73/170.33; 340/850

(56) References Cited

U.S. PATENT DOCUMENTS

| | | | |
|---|---|---|---|
| 4,203,109 | * 5/1980 | Ballard et al. ....................... | 340/850 |
| 4,533,945 | * 8/1985 | Lauvray et al. ..................... | 340/850 |
| 4,719,606 | * 1/1988 | Andrieu ............................... | 367/135 |
| 4,794,575 | * 12/1988 | Miller .................................. | 367/134 |
| 5,046,359 | 9/1991 | Layport . | |
| 5,060,206 | * 10/1991 | DeMetz, Sr. ............................ | 367/3 |
| 5,191,790 | 3/1993 | Layport . | |
| 5,721,712 | * 2/1998 | LaPointe .............................. | 367/118 |
| 5,951,346 | * 9/1999 | Woodall, Jr. ............................. | 367/4 |

\* cited by examiner

*Primary Examiner*—Ian J. Lobo
(74) *Attorney, Agent, or Firm*—Mark M. Friedman

(57) ABSTRACT

An acoustic warning assembly capable of being launched from an underwater vehicle while being underwater. The acoustic warning assembly includes an acoustosensitive member for collecting above-surface acoustic signals. The acoustic warning assembly also includes a carrier member launchable from the underwater vehicle, the carrier member is designed to carry the acoustosensitive member above-surface. The acoustic warning assembly also includes a communication medium for communicating between the acoustosensitive member and the underwater vehicle, for transmitting the above-surface acoustic signals collected by the acoustosensitive member to the underwater vehicle.

12 Claims, 7 Drawing Sheets

UNDERWATER LAUNCHED ACOUSTIC WARNING ASSEMBLY

FIELD AND BACKGROUND OF THE INVENTION

The present invention relates to an acoustic warning assembly and, more particularly, to an acoustic warning assembly capable of being launched from an underwater vehicle, such as a submarine.

A submarine, while being relatively protected when submerged, is exposed to attacks when surfaced. Such attacks are in many cases launched by helicopters equipped with missiles capable of penetrating the submarine's outer shell and severely damage and/or drawn the underwater vehicle.

However, while in air, a helicopter generates unique acoustic frequencies associated with its rotating main and tail rotor blades.

There is thus a widely recognized need for, and it would be highly advantageous to have, an acoustic warning assembly capable of being launched from an underwater vehicle, because such an assembly would enable submarines to detect above-surface helicopters while remained submerged and undetected thereby.

SUMMARY OF THE INVENTION

According to one aspect of the present invention there is provided an acoustic warning assembly capable of being launched from an underwater vehicle while being underwater, the acoustic warning assembly comprising (a) an acoustosensitive member for collecting above-surface acoustic signals; (b) a carrier member being launchable from the underwater vehicle, the carrier member being designed to carry the acoustosensitive member above-surface; and (c) a communication medium for communicating between the acoustosensitive member and the underwater vehicle, for transmitting the above-surface acoustic signals being collected by the acoustosensitive member to the underwater vehicle.

According to another aspect of the present invention there is provided a method of detecting a presence or absence of an airborne vehicle from a submerged underwater vehicle comprising the steps of (a) launching from the submerged underwater vehicle an acoustic warning assembly including an acoustosensitive member for collecting above-surface acoustic signals; (b) establishing a communication between the submerged underwater vehicle and the acoustic warning assembly for receiving the above-surface acoustic signals; and (c) analyzing the above-surface acoustic signals for detecting the presence or absence of the airborne vehicle.

According to yet another aspect of the present invention there is provided a method of identifying an airborne vehicle from a submerged underwater vehicle comprising the steps of (a) launching from the submerged underwater vehicle an acoustic warning assembly including an acoustosensitive member for collecting above-surface acoustic signals; (b) establishing a communication between the submerged underwater vehicle and the acoustic warning assembly for receiving the above-surface acoustic signals; and (c) using an acoustic signal frequency identifying algorithm capable of differentiating among types of airborne vehicles according to their acoustic signature, for analyzing the above-surface acoustic signals, for identifying the airborne vehicle.

According to still another aspect of the present invention there is provided an acoustic system for detecting a presence or absence of an airborne vehicle from a submerged underwater vehicle, the system comprising (a) an acoustic warning assembly capable of being launched from an underwater vehicle while being underwater, the acoustic warning assembly comprising (i) an acoustosensitive member for collecting above-surface acoustic signals; (ii) a carrier member being launchable from the underwater vehicle, the carrier member being designed to carry the acoustosensitive member above-surface; and (iii) a communication medium for communicating between the acoustosensitive member and the underwater vehicle, for transmitting the above-surface acoustic signals being collected by the acoustosensitive member to the underwater vehicle; and (b) an analyzer being installed in the underwater vehicle for receiving the above-surface acoustic signals via the communication medium and for analyzing the above-surface acoustic signals for detecting the presence or absence of the airborne vehicle.

According to yet another aspect of the present invention there is provided an acoustic system for identifying an airborne vehicle from a submerged underwater vehicle, the system comprising (a) an acoustic warning assembly capable of being launched from an underwater vehicle while being underwater, the acoustic warning assembly comprising (i) an acoustosensitive member for collecting above-surface acoustic signals; (ii) a carrier member being launchable from the underwater vehicle, the carrier member being designed to carry the acoustosensitive member above-surface; and (iii) a communication medium for communicating between the acoustosensitive member and the underwater vehicle, for transmitting the above-surface acoustic signals being collected by the acoustosensitive member to the underwater vehicle; and (b) an analyzer being installed in the underwater vehicle for receiving the above-surface acoustic signals via the communication medium and for analyzing the above-surface acoustic signals, the analyzer including an acoustic signal frequency identifying algorithm capable of differentiating among types of airborne vehicles according to their acoustic signature, for analyzing the above-surface acoustic signals, for identifying the airborne vehicle According to further features in preferred embodiments of the invention described below, the communication medium includes at least one communication wire.

According to still further features in the described preferred embodiments the acoustic warning assembly further comprising a lifting body releasably engaged within the carrier member, the lifting body being connected to the underwater vehicle via a tether.

According to still further features in the described preferred embodiments the at least one communication medium includes a deployable wire communicating between the acoustosensitive member and the lifting body, whereas the tether serves for communicating between the lifting body and the underwater vehicle.

According to still further features in the described preferred embodiments the acoustic warning assembly includes (i) a releasable protective cover engaged at a front end thereof, and (ii) a pressure sensitive mechanism for releasing the protective cover when the front end of the carrier member is above surface.

According to still further features in the described preferred embodiments the acoustic warning assembly includes a drag inducing mechanism for slowing its migration towards the water surface after launching.

According to still further features in the described preferred embodiments the acoustosensitive member includes a windshield for shielding the acoustosensitive member from wind.

According to still further features in the described preferred embodiments the acoustic warning assembly includes an ejecting mechanism engaged therein for ejecting the acoustosensitive member.

According to still further features in the described preferred embodiments the acoustic warning assembly includes a self destruction mechanism.

The present invention successfully addresses the shortcomings of the presently known configurations by providing new horizons for the survival of underwater vehicles in the aerial-marine battle zone.

BRIEF DESCRIPTION OF THE DRAWING

The invention herein described, by way of example only, with reference to the accompanying drawings, wherein.

DESCRIPTION OF THE PREFERRED EMBODIMENTS

Figure 2:
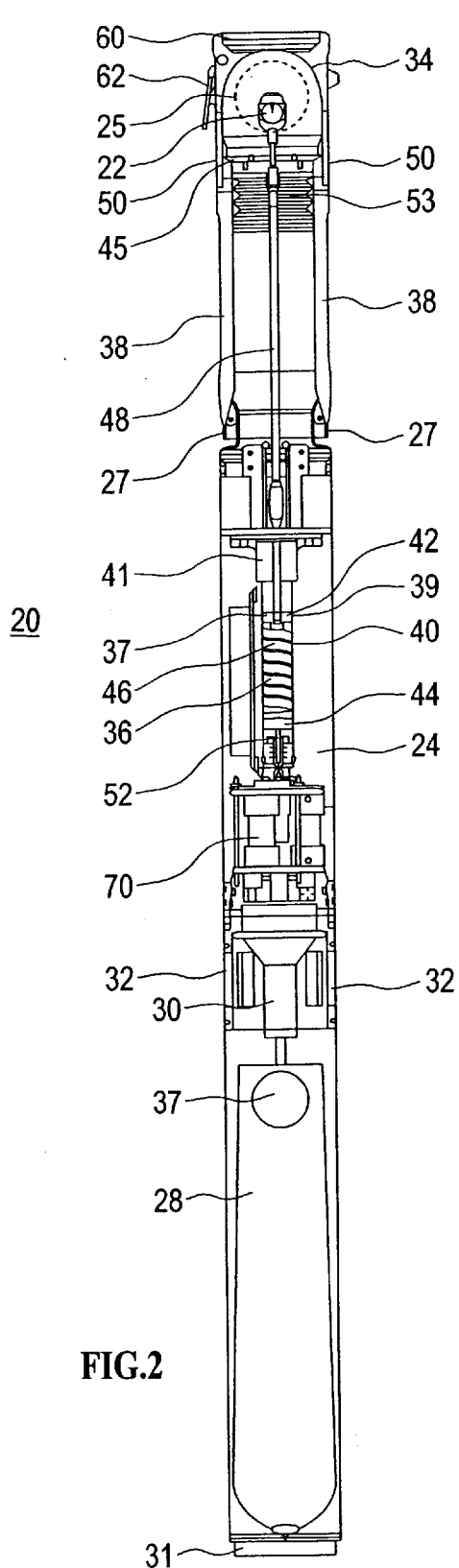
FIG. 2 is a cross sectional view of the acoustic warning assembly according to the present invention before launching.

The present invention is of an acoustic warning assembly which can be launched from an underwater vehicle, such as a submarine, a method of integrating same in an acoustic warning system and a method of using the integrated system. Specifically, the present invention can be used to alert a submerged submarine of a presence and optionally the type of anti-submarine airborne vehicles, e.g., helicopters.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIGS. 1–7 illustrate the various aspects of the acoustic warning assembly according to the present invention, which is referred to hereinbelow as assembly 20.

As already mentioned, assembly 20 is capable of being launched from an underwater vehicle 21 (shown in FIG. 7), such as a submarine, and maintain communication with underwater vehicle 21 for alerting underwater vehicle 21 while the latter is submerged deep (e.g., 80 meters) underwater.

To this end, acoustic warning assembly 20 includes an acoustosensitive member 22. Member 22 serves for collecting above-surface (above-water, air) acoustic signals. Member 22 can be any device capable of transforming sound waves into changes in electric current, resistance, charge, voltage or resistance, such as, but not limited to, a microphone. Laser based microphones are also applicable.

According to a preferred embodiment of the present invention acoustosensitive member 22 is protected by a windshield 25, for shielding acoustosensitive member 22 from wind associated acoustic signals.

Acoustic warning assembly 20 further includes a carrier member 24. Member 24 is designed to be launched from underwater vehicle 21 and to carry acoustosensitive member 22 above-surface, where it is operable.

Yet, acoustic warning assembly 20 furter includes a communication medium 26. Medium 26 serves for communicating between acoustosensitive member 22 and underwater vehicle 21, for transmitting the above-surface acoustic signals collected thereby to underwater vehicle 21.

According to a preferred embodiment of the present invention, communication medium 26 includes at least one deployable (e.g., spooled) communication wire, seen deployed in FIGS. 3–6. Yet wireless communication media, such as, but not limited to, in-water acoustic communication, etc., are also within the scope of the present invention.

U.S. Pat. Nos. 5,046,359, and 5,191,790, which are incorporated by reference as if fully set forth herein, teach assemblies capable of being launched from a submarine to carry into seawater an element responsive to a property of the water to be measured. The disclosed assemblies comprising a carrier member coupled to the element, a lifting body shaped to provide hydrodynamic lift, a tether for mechanically connecting the lifting body to the submarine, the lifting body and the tether being constructed and arranged so that the lifting body, when connected to a moving submarine, will move through the water at a distance above the submarine, a supply of electrically conductive cable connected to the element and stored at least in part by the lifting body for payout to accommodate movement of the submarine relative to the member, and releasable coupling means for holding the member and the lifting body together during their launch from the submarine and thereafter releasing the lifting body from the member. These patents also teach how to launch the carrier member from a submarine.

Figure 1:
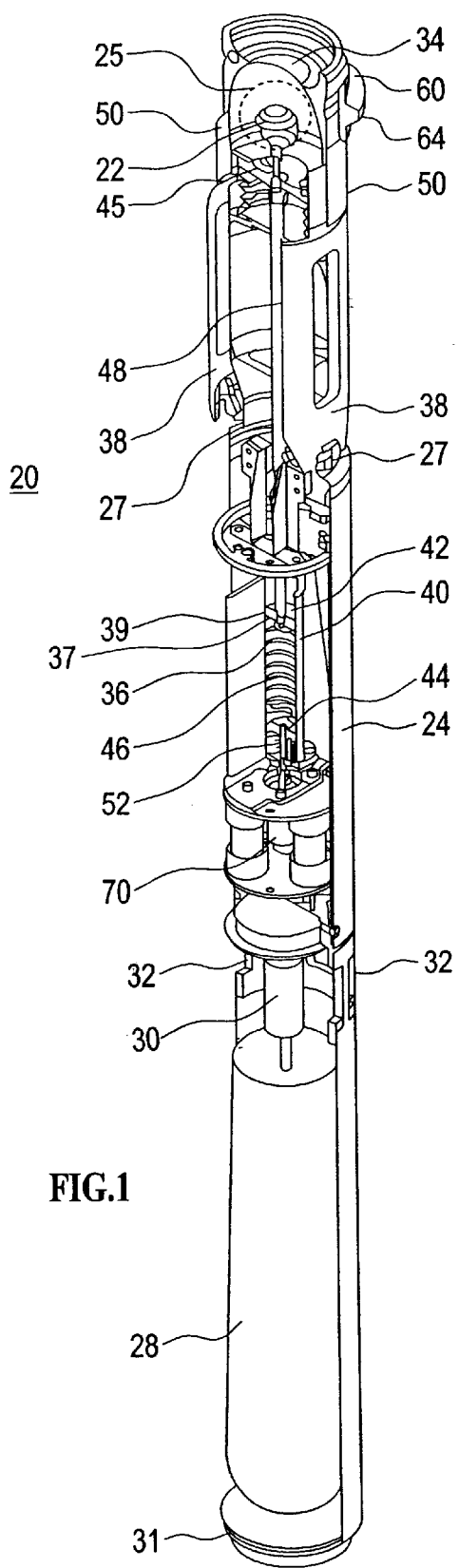
FIG. 1 is a perspective partially open view of an acoustic warning assembly according to the present invention before launching.
Figure 3:
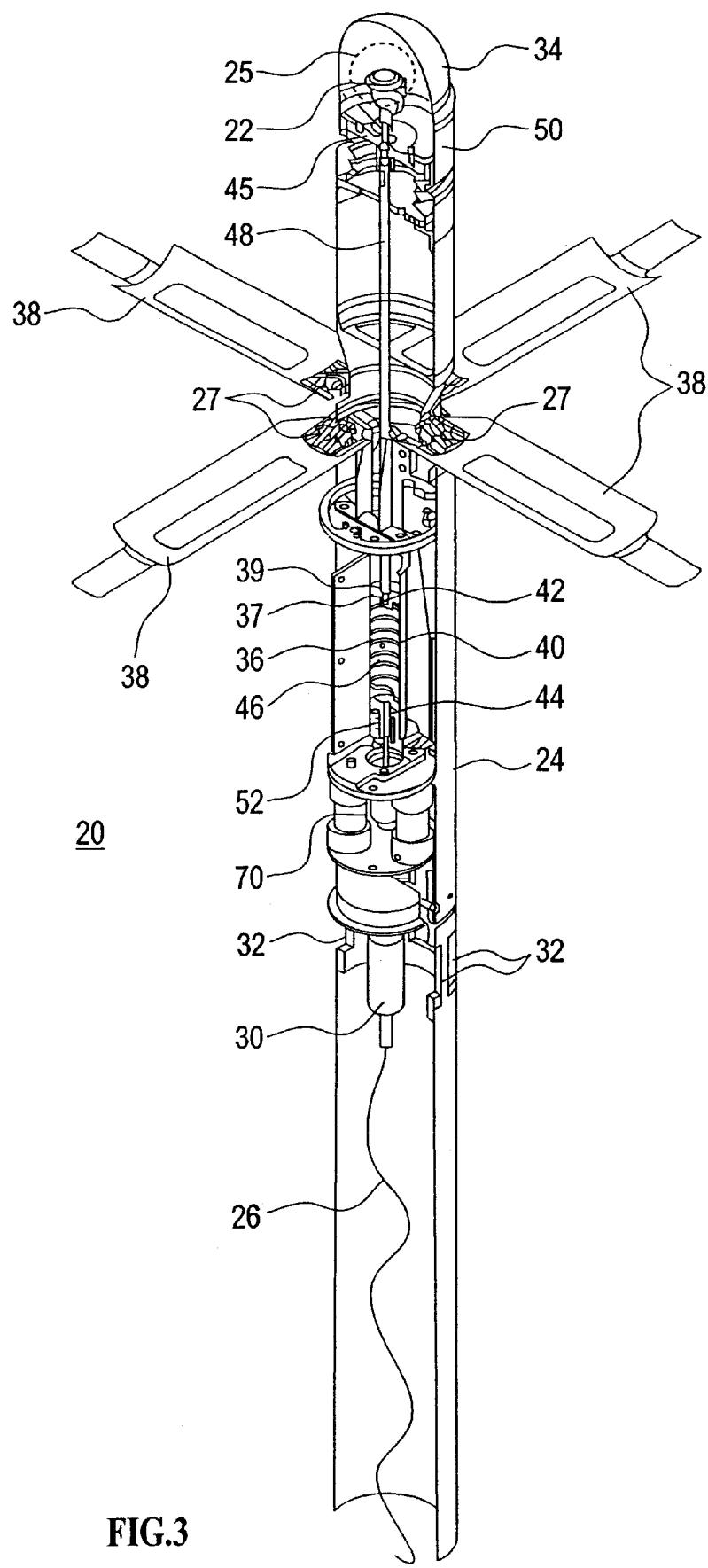
FIG. 3 is a perspective partially open view of an acoustic warning assembly according to the present invention after launching and before reaching the water surface.
Figure 4:
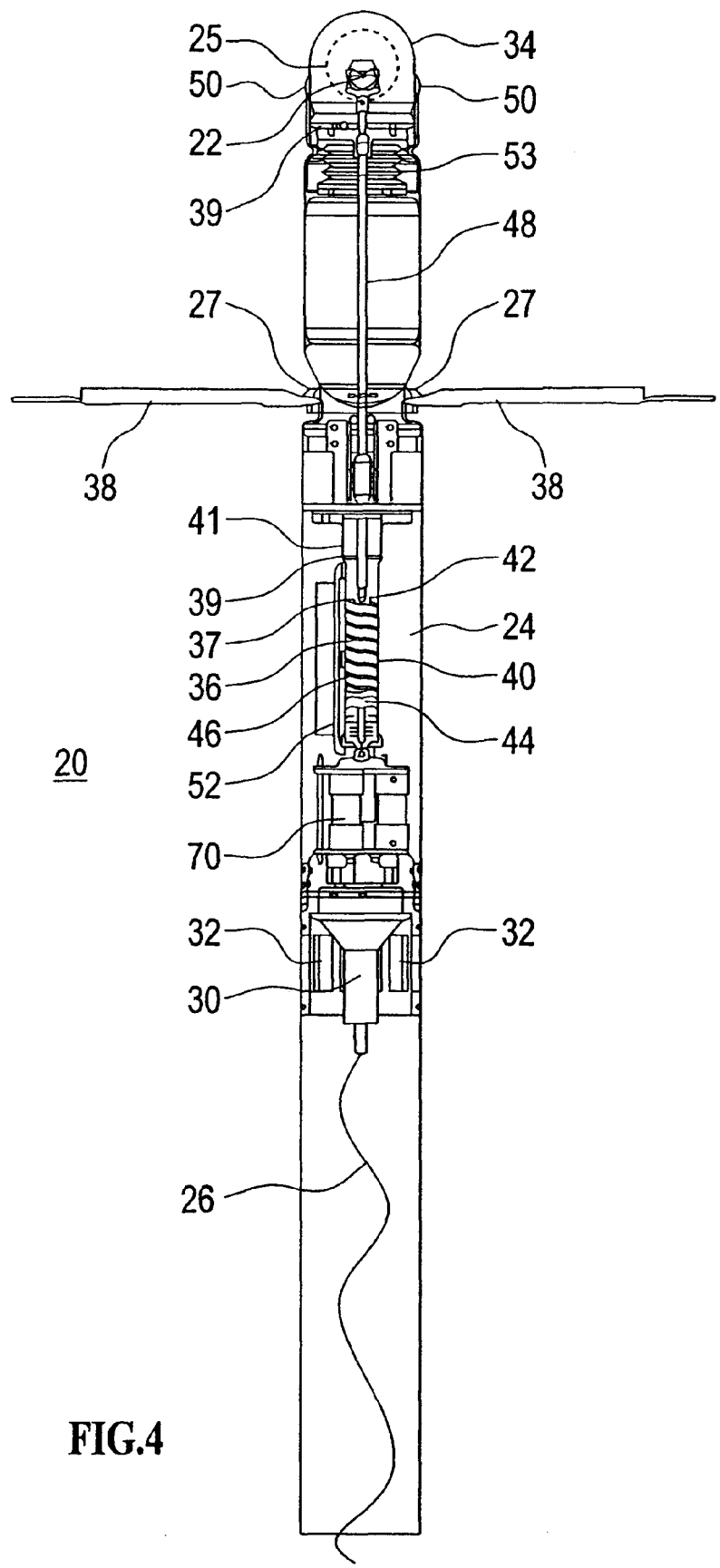
FIG. 4 is a cross sectional view of the acoustic warning assembly according to the present invention after launching and before reaching the water surface.
Figure 5:
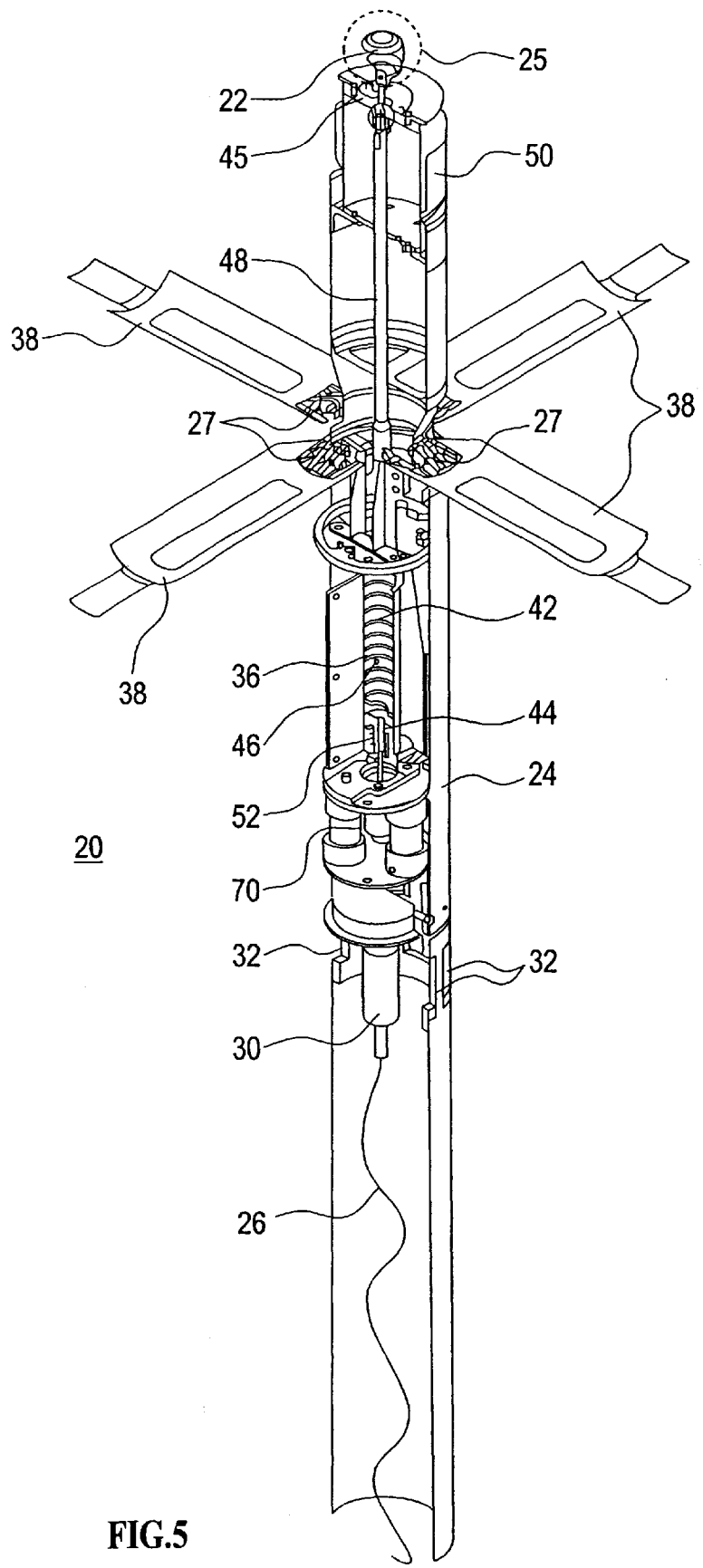
FIG. 5 is a perspective partially open view of an acoustic warning assembly according to the present invention after reaching the water surface.
Figure 6:
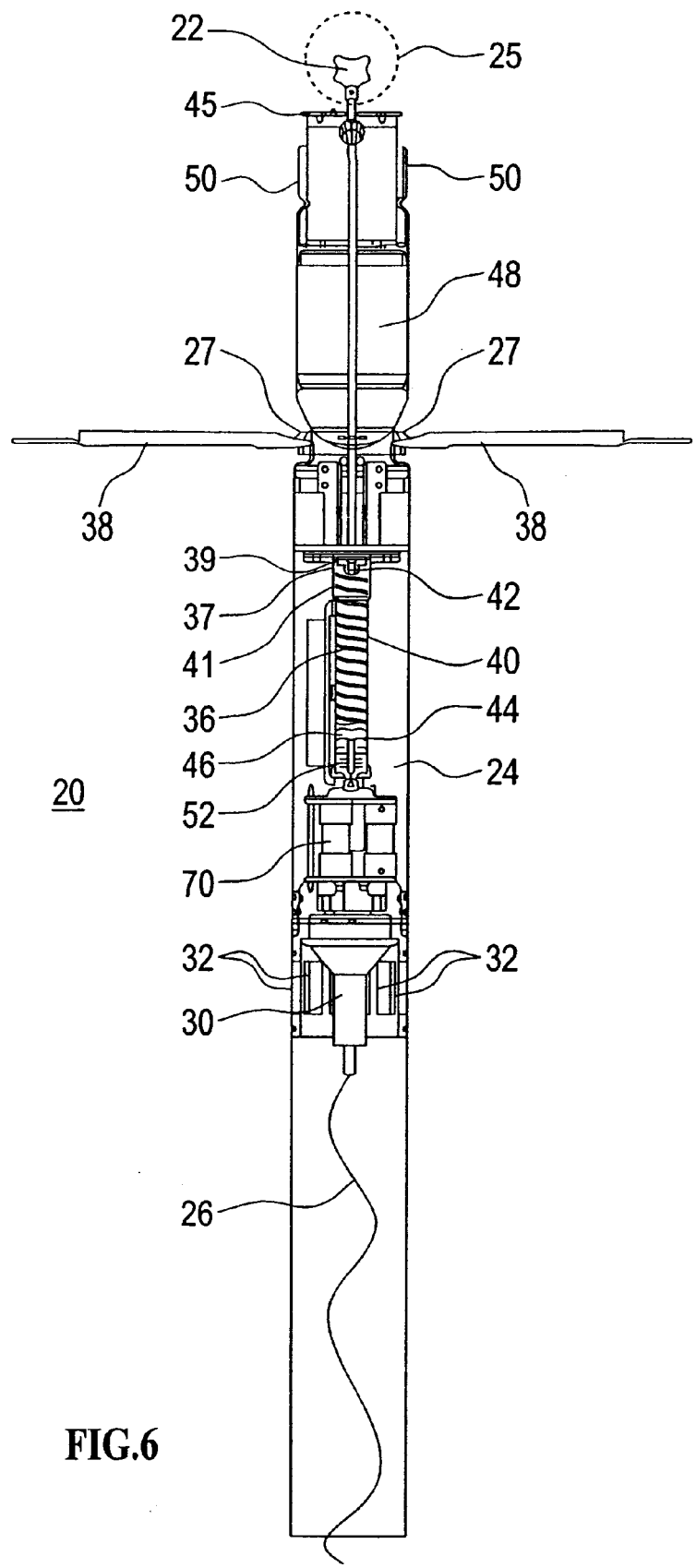
FIG. 6 is a cross sectional view of the acoustic warning assembly according to the present invention after reaching the water surface.
Figure 7:
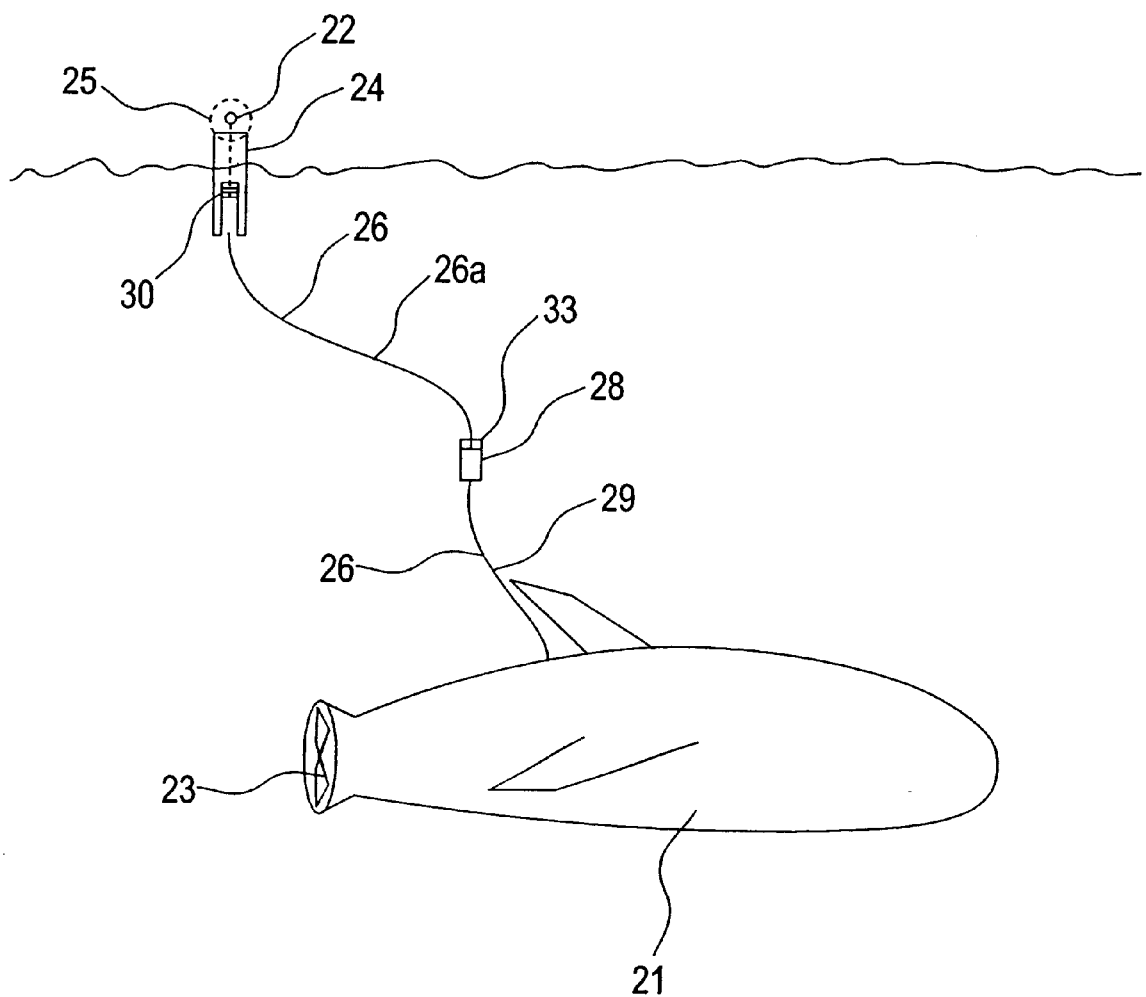
FIG. 7 is a schematic depiction of an assembly according to the present invention when deployed from a submarine.

According to a preferred embodiment of the present invention acoustic warning assembly 20 further includes a lifting body 28 (FIGS. 1–2 and 7). Body. 28 is releasably engaged within carrier member 24. A deployable tether 29 connects body 28 and underwater vehicle 21. Tether 29 is preferably rolled around body 28 prior to deployment and is selected strong enough to withstand drag forced inflicted thereupon when vehicle 21 locomotes and pulls body 28 via tether 29. However, tether 29 further serves for communicating between body 28 and vehicle 21. In this respect it forms a part of communication medium 26.

The release of lifting body 28 from member 24 after launch is effected, according to a preferred embodiment of the invention, by having a rear cover 31 (shown in FIGS. 1–2) of member 24 removed prior to launch, and entrance of seawater into member 24 via ventilation openings 32 while progressing to surface after launch. Alternatively, it is effected essentially as described in U.S. Pat. Nos. 5,046,359, and 5,191,790 via a releasable coupling mechanism, for holding lifting body 28 within carrier member 24 during their launch from the underwater vehicle and thereafter releasing the lifting body from member 24.

As best seen in FIG. 7, according to a preferred embodiment of the present invention, communication medium 26 includes a deployable wire 26a. Wire 26a is spooled at one end thereof on a first spool 30 engaged within member 24 and at the other end thereof on a second spool 33 engaged within body 28. Wire 26a serves for communicating between acoustosensitive member 22 and lifting body 28, whereas, as further detailed hereinabove, tether 29 serves for communicating between body 28 and vehicle 21.

This arrangement enables to efficiently deploy wire 26a and ensures that minimal drag forces act of wire 26a, even when underwater vehicle 21 locomotes and drags body 28 therebehind.

Lifting body 28, in turn, serves to keep communication wire 26a and tether 29 away from propellers 23 of underwater vehicle 21 when medium 26 is deployed.

According to a preferred embodiment of the present invention, carrier member 24 includes a releasable protective cover 34 (FIGS. 1–4) engaged at a front end thereof, and a pressure sensitive mechanism 36 for releasing (e.g., eventually detaching) protective cover 34 when the front end of carrier member 24 is above surface.

Cover 34 protects member 22 from hydrostatic pressure while underwater, such that a water resistant, yet pressure sensitive member 22 can be employed at lower costs. It is released and preferably dropped to the water when assembly 20 surfaces, as further detailed hereinunder. If so required, cover 34 may further protect windshield 25 from becoming soaked with water which may alter its acoustic properties. However, according to a preferred embodiment of the present invention windshield 25 is selected such that after being soaked it quickly releases water load therefrom.

Since according to a preferred embodiment of the invention pressure sensitive mechanism 36 serves additional functions, its construction and operation will be described in the following sections.

According to a preferred embodiment of the present invention carrier member 24 includes a drag inducing mechanism 38. Mechanism 38 preferably includes fin-like elements which are connected through deploying mechanisms 27 to assembly 20, are deployable after launch, and serve for slowing the migration of assembly 20 towards the water surface after launching, such that assembly 20 will not eject abruptly above water surface upon surfacing. As further detailed hereinunder, deploying drag inducing mechanism 38 is preferably controlled by pressure sensitive mechanism 36.

According to a preferred embodiment of the present invention carrier assembly 20 includes an ejecting mechanism engaged therein for ejecting acoustosensitive member 22 when surfaced. As further detailed hereinunder, the ejecting mechanism is preferably effected by pressure sensitive mechanism 36.

The operation and construction of sensitive pressure mechanism 36 according to a preferred embodiment of the present invention will now be described.

Sensitive pressure mechanism 36 includes a cylindrical envelope 40 engaging a front plunger 42, a rear halter 44 and a spring 46 therebetween. A rod 48 connects front plunger 42 and a translatable platform 45 which engages acoustosensitive member 22 and which is capable when translated to push away cover 34. When in water, the ability of spring 46 to extent is restricted by the hydrostatic pressure imposed on cover 34. This restriction is gradually reduced as assembly 20 progresses toward the surface. In order to further control the extension of spring 46, mechanism 36 further includes a dampening arrangement 37 which includes a narrow radial gap 39 formed between envelope 40 and plunger 42. Gap 39 is filled with oil with sufficient resistance to shearing forces (e.g., silicone oil having a viscosity v=1000 [cs]), such that it restrains the elevation of plunger 42 to a substantially constant speed, e.g., one mm per second. When translatable platform 45 is translated in a frontal direction, it pushes away cover 34. Cover 34 is engaged to a lower ring 50 which holds the distal ends of the fin-like elements of mechanism 38. At a certain point, when ring 50 elevates, mechanism 38 is released and deployed, thereby slowing the migration of assembly 20 to the surface. Then, and only a while (e.g., 10 seconds) after the arrival of assembly 20 to surface level, cover 34 is completely released and detached from assembly 20 by the action of platform 45. At this point, spring 46 continues to extend, further pushing platform 45 and ejecting acoustosensitive member to its final ejected position. Dampening arrangement 37 is designed such that it is inoperative in the last two stages, i.e., detaching cover 34 and fully ejecting member 20. This is achieved by limiting the region in which gap 39 is narrow, and following this narrow gap region with a wider gap region 41, for allowing free plunger movement.

While translating, mechanism 36 also operates a switch which activates the operation of member 22 as further detailed hereinunder. Sensitive pressure mechanism 36 further includes oil compensation system 52 for compensating for volume and temperature changes of dampening arrangement 37.

A passively extendible accordion like seal 53 engaged at one end thereof to platform 45 and at another end thereof to the body of member 24 is preferably employed to prevent water from entering member 24, since water within member 24 will hamper its specific weight and its weight distribution.

The specific weight of, and the weight distribution within, assembly 20, spring's 46 constant, the effectiveness of and duration of operation of dampening arrangement 37 and of drag inducing mechanism 38, and the specific construction of the various parts described are preferably selected such that (i) the fin-like elements of mechanism 38 are deployed when assembly 20 is about 9 meters under surface; (ii) when at surface level, now deployed fin-like elements of mechanism 38 are substantially at surface level, such that only a frontal quarter of assembly 20 protrudes from the water surface; (iii) the detachment of cover 34 and the full erection of acoustosensitive member 22 are achieved only after assembly 22 has settled at the surface.

It will be appreciated by one ordinarily skilled in the art that other mechanisms which are electrically powered and electronically controlled may replace mechanism 36, to otherwise similarly perform.

Assembly 20 includes a cover holder 60 for holding cover 34 at place under atmospheric pressure prior to launch (FIGS. 1–2). Cover holder 60 includes a safety pin 62 which is removed prior to launch by the launch crew and a safety ring 64 which is removed during launch by the launching port of underwater vehicle 21. The latter is removed only after assembly 20 is subjected to the hydrostatic pressure outside vehicle 21, such that cover 34 is now held in place by the pressure.

According to a preferred embodiment of the present invention, assembly 20 includes a self destruction mechanism 70. Mechanism 70 preferably includes a detonator and explosives. The detonator is controlled by a timer and/or chip-on-board and is powered via a power source, e.g., a lithium battery and power conditioning electronics.

The same or another power source and dedicated electronics are used to power and control the operation of acoustosensitive member 22. The dedicated electronics is triggered to operate by the switch that is operated by pressure sensitive mechanism 36. The electronics can also include a recording mechanism to record and store the signals collected by member 22 for delayed retrieval by underwater vehicle 21. Self destruction may be time preset or controlled from vehicle 21 via communication medium 26.

Further according to the present invention there is provided a method of detecting a presence or absence of an airborne vehicle, e.g., a helicopter, from a submerged underwater vehicle. The method is performed by executing the following method steps in which in a first step an acoustic warning assembly is launched from the submerged underwater vehicle, the acoustic warning assembly includes an acoustosensitive member for collecting above-surface acoustic signals. In a second step, a communication is established between the submerged underwater vehicle and acoustic warning assembly for receiving above-surface acoustic signals. Whereas, in a third step, above-surface acoustic signals are analyzed for detecting the presence or absence of the airborne vehicle. Analysis may be performed manually by simply listening to the noises, or electronically as further detailed hereinunder. A well trained listener will be able in most cases to identify the type of the airborne vehicle detected.

Further according to the present invention there is provided a method of identifying an airborne vehicle from a submerged underwater vehicle. The method is performed by executing the following method steps in which in a first step an acoustic warning assembly is launched from the submerged underwater vehicle, the acoustic warning assembly includes an acoustosensitive member for collecting above-surface acoustic signals. In a second step, a communication is established between the submerged underwater vehicle and acoustic warning assembly for receiving above-surface acoustic signals. Whereas, in a third step, an acoustic signal frequency identifying algorithm capable of differentiating among types of airborne vehicles according to their acoustic signature is used for analyzing above-surface acoustic signals, to thereby identify the airborne vehicle.

Thus, further according to the present invention there is provided an acoustic system for detecting a presence or absence of an airborne vehicle from a submerged underwater vehicle. The system includes an acoustic warning assembly capable of being launched from an underwater vehicle while submerged underwater, the acoustic warning assembly includes (i) an acoustosensitive member for collecting above-surface acoustic signals; (ii) a carrier member being launchable from the underwater vehicle, the carrier member is designed to carry acoustosensitive member above-surface; and (iii) a communication medium for communicating between the acoustosensitive member and the underwater vehicle, for transmitting above-surface acoustic signals being collected by acoustosensitive member to underwater vehicle.

The system further includes an analyzer installed in the underwater vehicle for receiving above-surface acoustic signals via the communication medium and for analyzing the above-surface acoustic signals, for detecting the presence or absence of the airborne vehicle. Alternatively the system is used for identifying an airborne vehicle from a submerged underwater. In this case, the analyzer includes an acoustic signal frequency identifying algorithm capable of differentiating among types of airborne vehicles according to their acoustic signature. This algorithm is employed for analyzing above-surface acoustic signals and thereby for identifying the type of the airborne vehicle.

Figure 8:
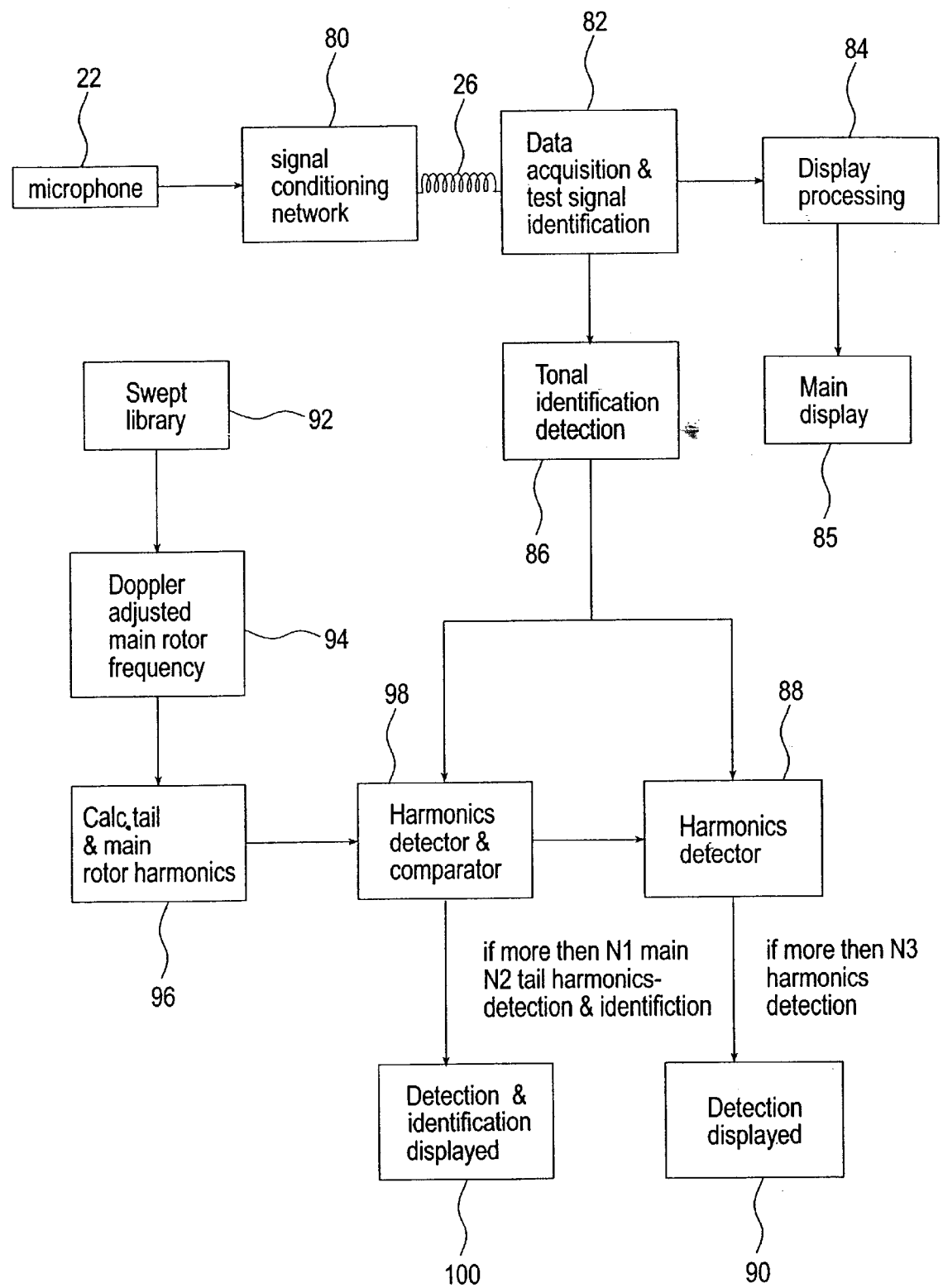
FIG. 8 is a black box diagram of an analyzer according to the present invention and of algorithms employed therein.

The following describes the system and analyzer according to a preferred embodiment of the present invention and a preferred detection/identification algorithm, with relation to FIG. 8 and Table 1.

When a helicopter is within detection and identification range of acoustosensitive member 22, it's associated acoustic signal or signature is picked-up by member 22. As indicated by box 80, this data signal is filtered and amplified by a conditioning network which also generates a test signal. Both signals are combined and sent to the underwater vehicle via wire 26.

As indicated by box 82, a signal processing unit installed in the underwater vehicle collects the combined signal and digitizes it. The test and data signals are then each filtered out from the combined signal and the test signal is identified to verify proper operation of system.

As indicated by box 84, a display processing system conditions the filtered data signal for presentation on a main display, which is indicated by box 85, which enables the operator to supervise system operation and also detect and identify targets manually, if so desired and in case of insufficient signal-to-noise ratio for automatic detection and identification as further detailed hereinunder, or in case of insufficient data.

As indicated by box 86, a tonal detection system actuates tone detection algorithms to facilitate automatic detection and identification of targets. A suitable tone detection algorithm can, for example, include a fast Fourier transform (FFT) algorithm for spectral analysis.

As indicated by box 88, a harmonic pattern detector sweeps the frequency spectrum of the signal for harmonic patterns, which are counted.

As indicated by 90, if more than N3 harmonic patterns are counted a detection sign is displayed. 92 indicates a swept library, an example of which is provided in Table 1, below, wherein each record therein includes a helicopter type field, main rotor frequency field and a tail rotor/main rotor frequency ratio field. These two latter constants are sufficient to uniquely identify a helicopter type.

As indicated by 94, each library entry is Doppler adjusted to compensate for helicopter approach velocity.

As indicated by box 96, main rotor harmonic patterns and tail rotor harmonic patterns are calculated and compared, as indicated by 98, to the detected data signal.

As indicated by 100, if more than N1 main motor harmonic patterns and more than N2 tail motor harmonic patterns are detected, an identification signal is displayed including the helicopter name, ammunition, etc., as retrieved from the library record.

N1, N2, and N3 are each independently an integer greater than 1, typically in a range of 2–50, typically 2–4, and are used to optimize the analyzer or the detection and identification system described herein.

TABLE 1

| HELD TYPE | MAIN ROTOR FREQUENCY | TAIL/MAIN RATIO |
|---|---|---|
| HELD 1 | 12 Hz | 2.9 |
| HELD 2 | 9 Hz | 3.1 |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An acoustic assembly capable of being launched from an underwater vehicle while being underwater, the acoustic assembly comprising:
   (a) an acoustosensitive member for collecting above-surface acoustic signals;
   (b) a carrier member including:
      (i) a releasable protective cover engaged at a front end thereof; and
      (ii) a pressure sensitive mechanism for releasing said protective cover when said front end of said carrier member is above surface, and
   (c) a communication medium for communicating between said acoustosensitive member and the underwater vehicle, for transmitting said above-surface acoustic signals being collected by said acoustosensitive member to the underwater vehicle,
wherein said carrier member is launchable from the underwater vehicle, and wherein said carrier member is designed to carry said acoustosensitive member above-surface.

2. An acoustic system for identifying a helicopter from a submerged underwater vehicle, the system comprising:
   (a) an acoustic assembly capable of being launched from an underwater vehicle while being underwater, the acoustic assembly including:
      (i) an acoustosensitive member for collecting above-surface acoustic signals;
      (ii) a carrier member being launchable from the underwater vehicle, said carrier member being designed to carry said acoustosensitive member above-surface; and
      (iii) a communication medium for communicating between said acoustosensitive member and the underwater vehicle, for transmitting said above-surface acoustic signals being collected by said acoustosensitive member to the underwater vehicle; and
   (b) an analyzer having an acoustic signal frequency identifying algorithm, said analyzer being installed in said underwater vehicle for receiving said above-surface acoustic signals via said communication medium and for analyzing said above-surface acoustic signals, and wherein said analyzing includes detecting a presence of harmonic patterns using said acoustic signal frequency identifying algorithm, thereby providing an identification of the helicopter.

3. The acoustic system of claim 2, wherein said acoustic signal frequency identifying algorithm is capable of differentiating among types of helicopters, such that a specific type of helicopter can be identified.

4. The acoustic system of claim 2, wherein said acoustic signal frequency identifying algorithm effects said identification of the helicopter by analyzing parameters including a main rotor frequency and a tail rotor to main rotor frequency ratio.

5. The acoustic system of claim 2, wherein said acoustic signal frequency identifying algorithm effects said identification of the helicopter by detecting a main motor harmonic pattern and a tail motor harmonic pattern.

6. The acoustic system of claim 2, wherein said analyzer includes a swept library having records, wherein each of said records therein includes a main rotor frequency field and a tail rotor/main rotor frequency ratio field, and wherein said algorithm effects said identification of the helicopter by detecting a main motor harmonic pattern and a tail motor harmonic pattern and comparing said patterns with said records.

7. An acoustic assembly capable of being launched from an underwater vehicle while being underwater, the acoustic assembly comprising:
   (a) an acoustosensitive member for collecting above-surface acoustic signals;
   (b) a carrier member being launchable from the underwater vehicle, said carrier member being designed to carry said acoustosensitive member above-surface, and said carrier member including:
      (i) a releasable protective cover engaged at a front end thereof, and
      (ii) a pressure sensitive mechanism for releasing said protective cover when said front end of said carrier member is above surface, and
   (c) a communication medium for communicating between said acoustosensitive member and the underwater vehicle, for transmitting said above-surface acoustic signals being collected by said acoustosensitive member to the underwater vehicle.

8. The acoustic assembly of claim 7, further comprising a lifting body being releasably engaged within said carrier member, said lifting body being connected to the underwater vehicle via a tether, wherein said communication medium includes a deployable wire communicating between said acoustosensitive member and said lifting body, whereas said tether communicating between said lifting body and the underwater vehicle, and further wherein said carrier member includes:
   (i) a drag inducing mechanism for slowing a migration of said carrier member towards a water surface after launching and prior to surfacing;
   (ii) a windshield assembled at a front end of said carrier member for shielding said acoustosensitive member from wind; and
   (iii) an ejecting mechanism engaged therein for ejecting said acoustosensitive member.

9. An acoustic assembly capable of being launched from an underwater vehicle while being underwater, the acoustic assembly comprising:
   (a) an acoustosensitive member for collecting above-surface acoustic signals;
   (b) a carrier member being launchable from the underwater vehicle, said carrier member being designed to carry said acoustosensitive member above-surface; and
   (c) a communication medium for communicating between said acoustosensitive member and the underwater vehicle, for transmitting said above-surface acoustic signals being collected by said acoustosensitive member to the underwater vehicle, wherein said carrier member includes a drag inducing mechanism for slowing its migration towards a water surface after launching and prior to surfacing, said drag inducing mechanism including fin-like elements.

10. A method of identifying the presence of a helicopter from a submerged underwater vehicle comprising the steps of:
(a) launching from the submerged underwater vehicle an acoustic assembly including an acoustosensitive member for collecting above-surface acoustic signals;
(b) establishing a communication between the submerged underwater vehicle and said acoustic assembly for receiving said above-surface acoustic signals; and
(c) using an acoustic signal frequency identifying algorithm capable of differentiating among types of airborne vehicles according to their acoustic signature, for analyzing said above-surface acoustic signals, such that the presence of a helicopter can be detected,
wherein said acoustic signal frequency identifying algorithm effects said identification of the helicopter by detecting harmonic patterns.

11. The method of claim 10, wherein said acoustic signal frequency identifying algorithm effects said identification of the helicopter by detecting a main motor harmonic pattern and a tail motor harmonic pattern.

12. The method of claim 11, wherein said acoustic signal frequency identifying algorithm compares said patterns to stored records containing a main rotor frequency field and a tail rotor/main rotor frequency ratio field.

* * * * *